United States Patent [19]

Vriens et al.

[11] Patent Number: 4,647,812
[45] Date of Patent: * Mar. 3, 1987

[54] DISPLAY TUBE HAVING A DISPLAY WINDOW WITH AN INTERFERENCE FILTER

[75] Inventors: Leendert Vriens; Johannes H. M. Spruit; Johannes C. N. Rijpers; Titus E. C. Brandsma, all of Eindhoven, Netherlands

[73] Assignee: U.S. Philips Corporation, New York, N.Y.

[*] Notice: The portion of the term of this patent subsequent to Jan. 6, 2004 has been disclaimed.

[21] Appl. No.: 742,834

[22] Filed: Jun. 10, 1985

Related U.S. Application Data

[63] Continuation-in-part of Ser. No. 662,311, Oct. 18, 1984.

[30] Foreign Application Priority Data

Jul. 20, 1984 [NL] Netherlands ............... 8402304

[51] Int. Cl.$^4$ .................. H01J 29/28; H01J 29/89
[52] U.S. Cl. ..................... 313/474; 350/1.6; 358/253
[58] Field of Search ............ 313/461, 474, 478; 358/247, 250, 252, 253, 255; 350/171, 172, 173, 174, 1.3, 1.6, 313

[56] References Cited

U.S. PATENT DOCUMENTS

| | | | |
|---|---|---|---|
| 3,902,012 | 8/1975 | Dalton et al. | 313/394 X |
| 4,310,783 | 1/1982 | Temple et al. | 313/474 |
| 4,310,784 | 1/1982 | Anthon et al. | 313/474 |

Primary Examiner—David K. Moore
Assistant Examiner—K. Wieder
Attorney, Agent, or Firm—Robert J. Kraus

[57] ABSTRACT

A display tube comprising in an evacuated envelope (1) a display screen (7) provided on the inside of a display window (2) in the wall of the envelope (1), which display screen (7) comprises luminescent material (13), and a multilayer interference filter (12) is provided between this material and the display window and compises a number of layers (HL) which alternately are manufactured from a material having a high (H) and a material having a low (L) refractive index. If the filter is composed substantially of 14 to 30 layers, each having an optical thickness nd, wherein n is the refractive index of the material and d is the thickness, which optical thickness is between 0.2 $\lambda_f$ and 0.3 $\lambda_f$ and preferably between 0.23 $\lambda_f$ and 0.27 $\lambda_f$, wherein $\lambda_f$ is equal to p x $\lambda$, wherein $\lambda$ is the desired central wavelength which is selected from the spectrum emitted by the luminescent material (13) and p is a number between 1.18 and 1.36, a display tube is obtained in which the luminous efficiency in the forward direction and at small angles for the central wavelength of the phosphor is at least 40% larger than in a tube without such a filter. Color improvement and gain in contrast also occur.

15 Claims, 8 Drawing Figures

DISPLAY TUBE HAVING A DISPLAY WINDOW WITH AN INTERFERENCE FILTER

CONTINUING APPLICATION DATA

This application is a continuation-in-part of U.S. Application Ser. No. 662,311 filed on Oct. 18, 1984, which is hereby incorporated by reference.

BACKGROUND OF THE INVENTION

The invention relates to a display tube comprising in an evacuated envelope a display screen of a luminescent material provided on the innerside of a display window in the wall of the envelope, and a multilayer interference filter disposed between said material and the display window, said filter comprising a plurality of layers manufactured alternately from a material having a high refractive index and a material having a low refractive index.

Display tubes have a wide field of application. They are used, for example, as projection television display tubes, oscilloscope tubes, X-ray amplifier tubes, D.G.D.-tubes (DGD=Data Graphic Display), or as television display tubes.

Such a display tube is known from German Patent Application No. 2330898 laid open to public inspection, in which a multilayer interference filter is used between the luminescent material (the phosphor) and the display window. In the case of layers of the filter having a material with a high refractive index the optical thickness of each layer is chosen to be smaller than $0.25\lambda$ or between 0.5 and $0.75\lambda$ wherein $\lambda$ is the wavelength of the light emitted by the luminescent material. For the layers of the fiter having a material with a low refractive index an optical thickness of $0.25\lambda$ is used or an odd multiple thereof. The light reflection characteristic of the display screen of the tube is varied by the filter so that the quantity of light reflected within a limited angular aperture increases by 25% as compared with a tube without a filter. At the same time the contrast in the produced picture is increased by a reduction of the background brightness.

A similar tube is disclosed in British Patent Specification No. 1,306,335 in which a so-called pass-band interference filter is provided between the phosphor and the display screen. This filter consists of layers having an optical thickness of $0.25\lambda$ and has the following composition: S L H L L L L L L H L H L L L L L L H L H L L L L L L H, wherein S is the dislay screen, L are layers of a material having a low refractive index and H are layers from a material having a high refractive index. Such a filter may also be written as follows:

$$S\ L\ H\ (L)^6\ H\ L\ H\ (L)^6\ H\ L\ H\ (L)^6\ H.$$

As a result of the presence of the six layers placed against each other and having a low refractive index $(L)^6$, a Fabry-Perot filter is formed. With a given choice of the optical layer thickness, the filter has a desired transmission band for light rays which maker an angle smaller than 25° to 40° to the normal on the filter. In addition, however, there is an undesired wide transmission band for light rays which enclose an angle between 55° and 90° to the normal. All the light which is passed in this band is lost or contributes to the so-called halo and as a result of this to loss of contrast in the displayed picture. This will be explained in detail hereinafter. The cryolite layers used in this filter moreover are hygroscopic and remain soft, so that damage to the filter can easily occur. The zinc sulphide layers (ZnS) used in this filter easily oxidize when the tube is fired at approximately 460° C., so that they are less suitable for use in display tubes.

The article "Anti-halo coatings for cathode ray tube face plates", by J. D. Rancourt, Proceedings of the SID, vol.25/1 discloses an 11-layer "edge" filter and an 8-layer "pass-band" interference filter for suppressing halo effects. It is also suggested to use one of these filters for projection-T.V. (pag. 47, top right). An 11-layer filter, however, for projection-T.V. gives much loss because too much light is passed at large angles.

SUMMARY OF THE INVENTION

It is therefore an object of the invention to provide a display tube having a multilayer interference filter in which the total quantity of light produced by the tube within an angular aperture of 25° to 40° to the normal is at least 40 to 50% larger, for the central wavelength, as compared with a similar tube without a filter.

Another object of the invention is to indicate such a special choice of the multilayer interference filter that no second transmission band occurs for light rays which make an angle between approximately 35° and 90° to the normal on the filter.

A further object of the invention is to provide a display tube having a multilayer interference filter in which it is possible to realize a colour improvement and a greater contrast in the displayed picture as compared with the known tubes.

An additional object of the invention is to provide a display tube having a multilayer interference filter which can be fired at 440° to 460° C.

According to the invention, a display tube of the kind described in the opening paragraph is characterized in that the filter is composed substantially of 14 to 30 layers, and preferably 18 to 22 layers, each having an optical thickness nd, wherein n is the refractive index of the material of the layer and d is the thickness, the optical thickness nd being between $0.2\lambda_f$ and $0.3\lambda_f$ and preferably between $0.23\lambda_f$ and $0.27\lambda_f$, wherein $\lambda_f$ is equal to p x$\lambda$, in which $\lambda$ is the desired central wavelength selected from the spectrum emitted by the luminescent material and p is a number between 1.18 and 1.36. The average optical thickness is $0.25\lambda_f$ and $\lambda_f$ is the central wavelength of the filter. On a frequency scale $\lambda_f$ (or rather $1/\lambda_f$) corresponds to the centre of the reflection band upon perpendicular incidence of the light. The outermost layers of the filter are preferably manufactured from a material having a high refractive index.

Hence the filter consists only or substantially only of layers having an optical thickness of approximately $0.25\lambda_f$. Herefrom the filter derives the special property of the very wide reflection band (no transmission) for light rays which make an angle between approximately 35° and 90° to the normal on the filter.

For example, in $0.75\lambda_f$ and $1.25\lambda_f$ filters the width of the reflection band is reduced by a factor of 3 and 5, respectively, and undesired transmission occurs with large angles. As a result of this, the gain in luminous efficiency in the forward direction in such filters, hence for light rays which make small angles to the normal on the filter, as, for example, in German Patent Application No. 2330898, is restricted to 25%. There is also less gain in contrast. The Fabry-Perot filter according to British Patent Specification No. 1,306,335 comprises three $1.5\lambda$ layers (each consisting of six 0.25λ layers of a material having a low refractive index) and also has an undesired wide transmission band for light rays which make large angles to the normal on the filter.

As already mentioned, filters for halo suppression are described in the article "Proceedings of the SID", Vol. 25/1, 1984. Filters are described whose prime object is not first of all to improve the luminous efficiency in the forward direction. Even absorbing filters are used. Due to their small number of layers, such filters are less critical as regards the angle within which the reflection decreases considerably (the acceptation angle). A characteristic of the present invention is that the position of the "edge" of the filter (hence p and $\lambda_f$ in $\lambda_f = p\lambda$) is exactly defined and the acceptation angle is comparatively small. As a result of this the filter is very sensitive to losses at large angles and, therefore, filters having many layers (14 to 30) are desirable.

The layer thicknesses in the filter according to the invention are hence chosen to be so that at a desired wavelength the reflection begins to increase considerably for light rays from a luminescent material which make an angle exceeding 20° to 35° to the normal on the filter. The wide reflection band ensures that light rays having angles larger than 25° to 40° are reflected as much as possible and after scattering in the luminescent material again get a chance to emanate from the tube within an angle of 25° to 40° to the normal on the filter. As a result of this a maximum luminous efficiency in the forward direction and at small angles is obtained, which for the central wavelength λ of the phosphor is at least 40% larger than without using the filter. Moreover, the wide reflection band ensures a considerably reduced halo-effect and less light emanating at large angles. The optical thickness nd of the layers of the filter preferably is not the same for all layers but varies between $0.2\lambda_f$ and $0.3\lambda_f$, and preferably between $0.23\lambda_f$ and $0.27\lambda_f$, as will be explained in greater detail with reference to an embodiment. As a result of this variation of the thickness, a flatter response curve of the filter is obtained. Because the response curve of the filter depends on the wavelength, it is possible, by a combination of a phosphor and an adapted filter, to improve the colour point of the light rays which pass through the filter within an angle of 25° to 40° to the normal on the filter.

The value of the number p is between 1.18 and 1.36, dependent on the refractive indices of the layers used and on the width of the selected wavelength range, which will be explained inter alia with reference to the specific example. For a $TiO_2$—$SiO_2$ filter, $p=\lambda_f/\lambda$ is between 1.22 and 1.36.

A first preferred embodiment of a display tube according to the invention is characterized in that the luminescent material comprises a terbium-activated, substantially green-luminescing phosphor and λ=545 nm and p is a number between 1.22 and 1.27 for a $TiO_2$—$SiO_2$ filter. Terbium-activated, substantially green-luminescing phosphors are, for example, yttrium aluminium garnet-terbium (YAG:Tb), Yttrium silicate-Terbium ($Y_2SiO_5$:$T_b$), Lanthanum oxide bromide-Terbium (LaOBr:Tb), Lanthanum oxychloride-Terbium (LaOCl:Tb), and Indium borate-Terbium ($InBO_3$:Tb). The central wavelength λ for al these Tb-activated green phosphors=545 nm. By choosing for the filter according to the invention p between 1.22 and 1.27, hence $\lambda_f$ between 660 and 690 nm, a filter is obtained having a high transmission (exceeding 90%) for light rays which make an angle smaller than 20° to 35° to the normal on the filter. For light rays which make an angle larger than 25° to 40° to the normal on the filter, the transmission declines rapidly and up to 90° reflection occurs. This filter operates particularly well with these Tb-activated phosphors which have emission lines in the blue, green, orange-red and red. By using the filter a gain occurs in the green, a much smaller gain in the blue and a substantially complete reduction of the quantity of light radiated by the tube in the red, which is favourable for the color point. All this provides a luminous efficiency and colour improvement (closer to the EBU standards) and gain in contrast. In an optimum filter with these Tb-activated phosphors the total gain in luminous efficiency for all colours together is 30 to 60%. The gain in the green is 50 to 100%. The coordinates x and y in the CIE colour triangle then are 0.26 to 0.30 and 0.60 to 0.64, respectively. Without a filter these coordinates are x=0.33 to 0.36 and y=0.54 to 0.59, respectively. The gain in contrast is approximately a factor 2. For optical display with lenses, as in the case of projection television, this presents important advantages, much less chromatic aberration (little or no red and proportionately less blue vis à vis the green).

A second preferred embodiment of a display tube in accordance with the invention is characterized in that the luminescent material comprises a terbium-activated blue-luminescing phosphor with λ=490 nm and p is a number between 1.22 and 1.27 for a $TiO_2$—$SiO_2$ filter. By using a small quantity of Tb for the doping, a predominantly blue-luminescing phosphor with λ=490 nm is obtained. By choosing p between 1.22 and 1.27, hence $\lambda_f$ between 595 nm and 620 nm, a filter is obtained in which the reflection for light rays which make an angle exceeding 25° to 40° to the normal on the filter, increases comparatively steeply. Then there is a gain in contrast of 70% to 100%, and a gain in luminous efficiency in the blue of 50 to 90%. In this case there is a considerable colour point improvement because the green spectral lines are filtered away by the multilayer filter.

A third preferred embodiment of a display tube in accordance with the invention is characterized in that luminescent material is europium-activated Yttrium oxide ($Y_2O_3$:Eu) and λ=612 nm and p is a number between 1.22 and 1.27 for a $TiO_2$ and $SiO_2$ filter. As a result of this choice of p between 1.22 and 1.27, hence $\lambda_f$ between 745 nm and 780 nm, the reflection of the filter for light rays which make an angle exceeding 25° to 40° to the normal on the filter increases considerably. Now there is a gain of 60 to 100% in overall luminous efficiency. The gain in contrast is approximately 100%. In this case there is a small colour point improvement. The red components in the spectrum of the generated light are actually intensified more than the components of shorter wavelength.

The invention may also be used in wide-band phosphors, for example Willemite ($Zn_2SiO_4$:Mn), zinc sulphide-silver (ZnS:Ag) and strontium aluminate-europium ($SrAl_3O_{5.5}$:Eu), with central wavelengths λ of 530 nm, 460 nm and 460 nm, respectively. The value of p is now chosen between 1.25 and 1.36.

In all the embodiments the layers of the filter with a high refractive index preferably consist of titanium oxide ($TiO_2$) or tantalum oxide ($Ta_2O_5$). The layers having a low refractive index preferably consist of silicon dioxide ($SiO_2$) or magnesium fluoride ($MgF_2$). These layers are preferably provided by vapour deposition or sputtering. The vapour deposition of the $MgF_2$ must be carried out warm (approximately 300° C.) to obtain a sufficiently hard layer. The optimum p-values for a $Ta_2O_5$—$SiO_2$ filter are approximately 0.04 to 0.05 lower than for a $TiO_2$—$SiO_2$ filter. The reflection band then is less wide.

A fourth preferred embodiment of a display tube in accordance with the invention is characterized in that the outermost approximately $0.25\lambda_f$-thick layer of the filter facing the luminescent material consists of a material having a high refractive index and is coated with a terminating layer with an optical thickness of approximately $0.125\lambda_f$ of a material having a lower refractive index, on which terminating layer the luminescent material is provided.

A fifth preferred embodiment of a display tube in accordance with the invention is characterized in that the outermost approximately $0.25\lambda_f$-thick layer of the filter facing the display window consists of a material having a high refractive index and is coated with an intermediate layer having an optical thickness of approximately $0.125\lambda_f$ of a material having a lower refractive index. By providing a terminating layer and/or an intermediate layer having an optical thickness of approximately $0.125\lambda_f$ at the phosphor side and/or the display window side, respectively, the transmission in the forward direction for light rays which enclose small angles to the normal is increased and the oscillations in the transmissions are reduced. The response curve becomes flatter.

A sixth preferred embodiment of a display tube in accordance with the invention is characterized in that the outermost approximately $0.25\lambda_f$-thick layer of the filter facing the luminescent material is composed of a mixture of metal oxides, which mixture comprises titanium oxide ($TiO_2$) and a metal oxide from the group beryllium oxide (BeO), magnesium oxide (MgO) and calcium oxide (CaO), in which mixture the quantity of titanium oxide is 70 to 99% by weight.

By using such an extra smooth, hence less porous coating layer on the phosphor side of the filter, the optical contact with the phosphor is reduced so that the gain in contrast and luminous efficiency is extra increased.

Tubes according to the invention are coupled to a system of lenses, preferably optically via liquid, or are provided with liquid cooling in which the coating glass on the outside is provided with an antireflection layer. As a display window may be used a substantially flat window as is commonly used in projection television display tubes.

As a display tube may optionally also be used a window of glass fibre optics as described in United States Patent Specification No. 3,226,589 which may be considered to be incorporated herein.

Display tubes according to the invention may be used effectively in projection television devices. The very bright image emitted in the forward direction is captured substantially without losses by a system of lenses having a restricted acceptation angle of, for example, 25° to 30°. As a result of this, a brighter picture with more contrast and an improved colour rendition is obtained.

BRIEF DESCRIPTION OF THE DRAWING

The invention will now be described in greater detail, by way of example, with reference to a drawing, in which.

DESCRIPTION OF THE PREFERRED EMBODIMENT

Figure 1:
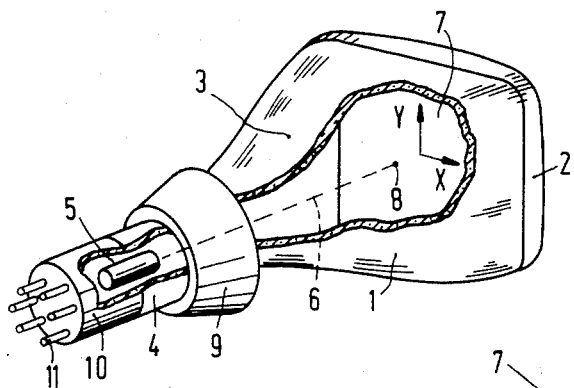
FIG. 1 is an elevation, partly broken away, of a projection television display tube.

FIG. 1 is a perspective view, partly broken away, of a projection television display tube according to the invention. It comprises in a glass envelope 1 which consists of a display window 2, a cone 3 and a neck 4, in said neck an electron gun 5 gor generating an electron beam 6. Said electron beam 6 is focused on a display screen 7 to form a spot 8. The display screen 7 is provided on the inside of the display window 2. The electron beam is deflected over the display screen 7 in two mutually perpendicular directions x, y by means of the system of deflection coils 9. The tube comprises a cap 10 having connection pins 11.

Figure 2:
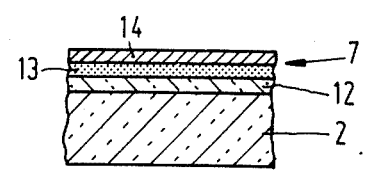
FIG. 2 is a sectional view of a part of the display screen, filter and display window.

FIG. 2 is a diagrammatic sectional view of a part of a display window 2, the multilayer interference filter 12 and the display screen 7. The display screen again consists of a layer of luminscent material (Phosphor) 13 and a thin aluminium film 14 (the so-called "aluminium backing").

Figure 3:
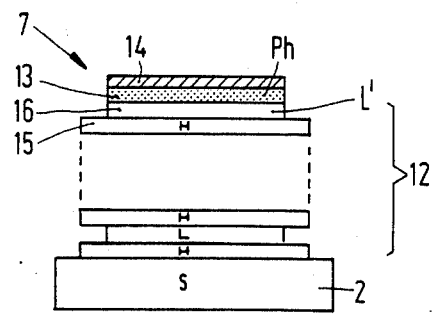
FIG. 3 shows diagrammatically the composition of a filter as used in a display tube according to the invention.

FIG. 3 shows diagrammatically a 20-layer-filter 12 between a display screen 7, consisting of a layer of phosphor 13 (Ph) and an aluminium film 14, and the display window 2 (S). The filter consists of layers $SiO_2$ (refractive index n=1.47) indicated by a letter L and L', and layers of $TiO_2$ (n=2.35) indicated by a letter H. The layers have a thickness of approximately $0.25\lambda_f$. The last approximately $0.25\lambda_f$ thick layer 15 on the side of the display screen 7 is coated with an approximately $0.125\lambda_f$ thick terminating layer 16 (L').

The phosphor 13 is a Tb-phosphor with $\lambda$=545 nm. At p=1.25, $\lambda_f$ becomes equal to 680 nm. The filter compostion at this $\lambda_f$ is recorded in the following table.

| Layer No. | n | n.d/$\lambda_f$ |
|---|---|---|
| Phosphor | | |
| 1 | L | 0.131 |
| 2 | H | 0.260 |
| 3 | L | 0.257 |
| 4 | H | 0.254 |
| 5 | L | 0.251 |
| 6 | H | 0.249 |
| 7 | L | 0.247 |
| 8 | H | 0.246 |
| 9 | L | 0.245 |
| 10 | H | 0.245 |
| 11 | L | 0.244 |
| 12 | H | 0.245 |

| Layer No. | n | n.d/λ_f |
|---|---|---|
| 13 | L | 0.245 |
| 14 | H | 0.246 |
| 15 | L | 0.247 |
| 16 | H | 0.249 |
| 17 | L | 0.251 |
| 18 | H | 0.254 |
| 19 | L | 0.257 |
| 20 | H | 0.260 |
| Display window | 1.57 | |

Figure 4:
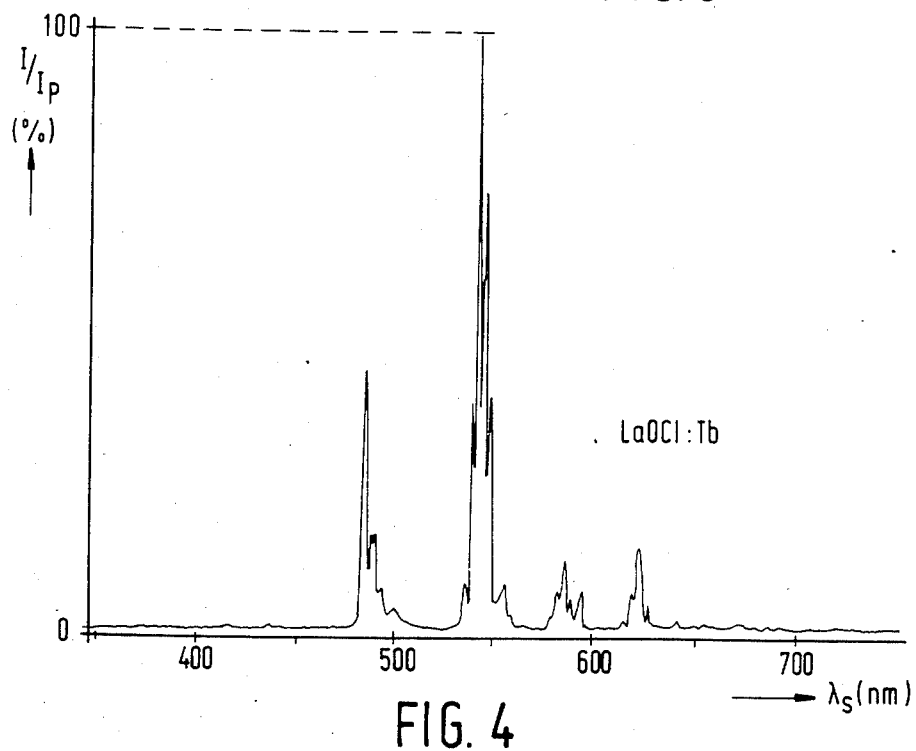
FIG. 4 shows a spectrum of LaOCl:Tb.

FIG. 4 shows the spectrum (the intensity standardized on the highest peak ($I_p$) in % as a function of $\lambda_s$) of lanthanum oxychloride-Terbium. This spectrum is representative of all green terbium phosphors, for example,
  yttrium aluminium garnet-terbium (YAG:Tb)
  yttrium silicate-terbium ($Y_2SiO_5$:Tb)
  Lanthanum oxybromide-terbium (LaOBr:Tb) and
  indium borate-terbium ($InBO_3$:Tb).

Figure 5:
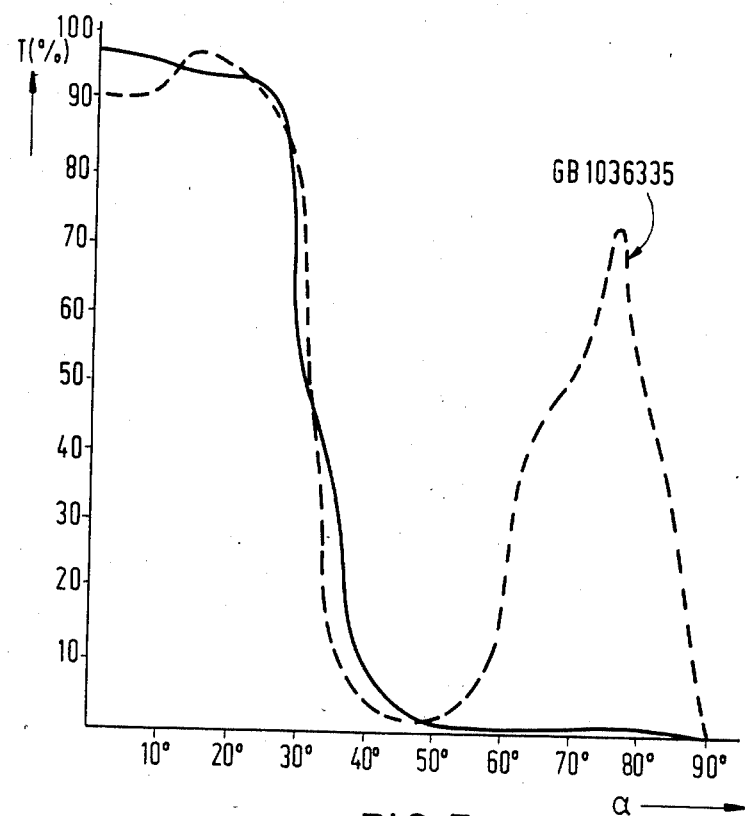
FIG. 5 shows the transmission T as a function of the angle $\alpha$ with respect to the normal for light rays through a filter as shown in FIG. 3 for a display tube according to the invention.

FIG. 5 shows the transmission T (solid line) of the filter shown in FIG. 3 as a function of the angle $\alpha$ with respect to the normal on the filter for $\lambda = 545$ nm. The angle $\alpha_{50\%}$, at which the transmission of the filter has decreased to 50%, is approximately 32°%. For comparison, this Figure shows the transmission (broken line) as a function of the angle $\alpha$ for the Fabry-Perot filter according to the said British Patent Specification No. 1,306,335. In order to make this filter comparable with the filter shown according to the invention, $\alpha_{50\%}$ for this filter has also been chosen to be 32°. Moreover, the materials have been chosen to be the same, namely $TiO_2$ and $SiO_2$. Due to the different character of the filter, p=1.02 in this case, hence $\lambda_f = 1.02 \times 545 = 555$ nm. A great disadvantage of this filter is the wide transmission band between 55° and 90°. All the light which is transmitted in this transmission band is lost or, after reflection, contributes to halo and thus gives loss of contrast. This disadvantage also applies to 0.75$\lambda_f$ and 1.25$\lambda_f$ filters.

Figure 6:
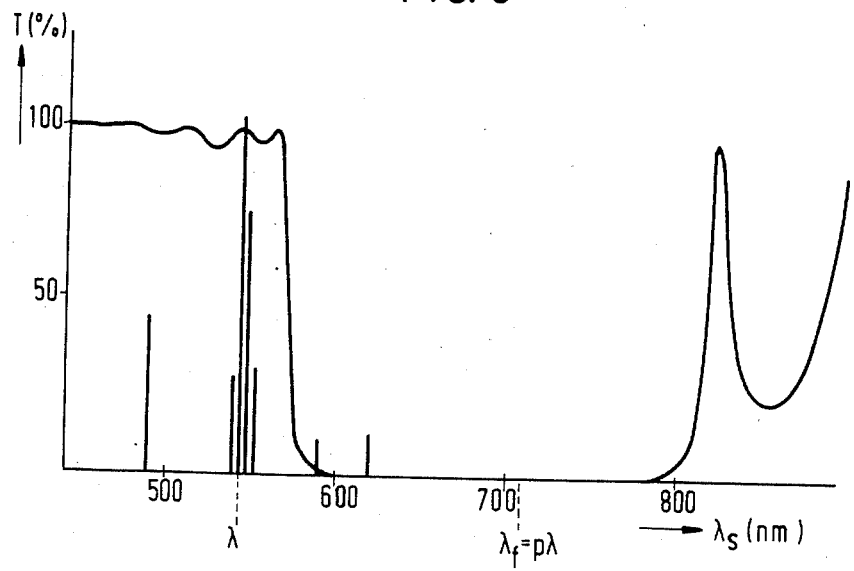
FIG. 6 shows the transmission T for perpendicularly incident light rays (0°) as a function of the spectral wavelength $\lambda_s$ for the filter shown in FIG. 3.

FIG. 6 shows the transmission T for light rays which are incident perpendicularly on the filter (0°) as a function of the spectral wavelength $\lambda_s$ of the FIG. 3 filter. The low pass character of the filter (short-wave-pass-filter) is quite obvious and so is the wide reflection band between 570 and 815 nm.

Figure 7:
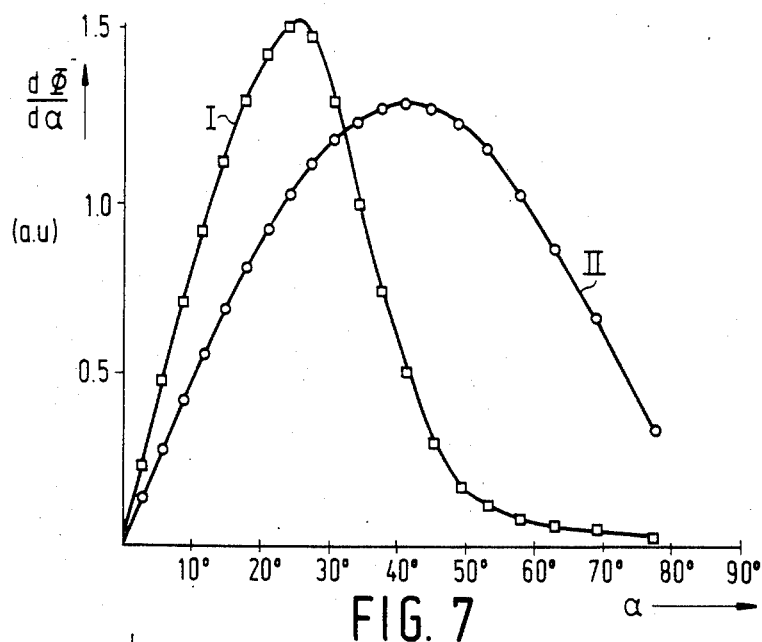
FIG. 7 shows the angular distribution of the emitted light $d\phi/d\alpha$ as a function of the angle $\alpha$ measured on a projection television display tube.

FIG. 7 shows the light flux $\phi$ as a function of the angle ($d\phi/d\alpha$) in arbitrary units as measured in a projection television display tube having a 20-layer-filter as shown in FIGS. 3, 5 and 6. For $\alpha$ smaller than 32° there is a clear gain in luminous efficiency (curve I) with respect to a projection television display tube without a filter (curve II).

Figure 8:
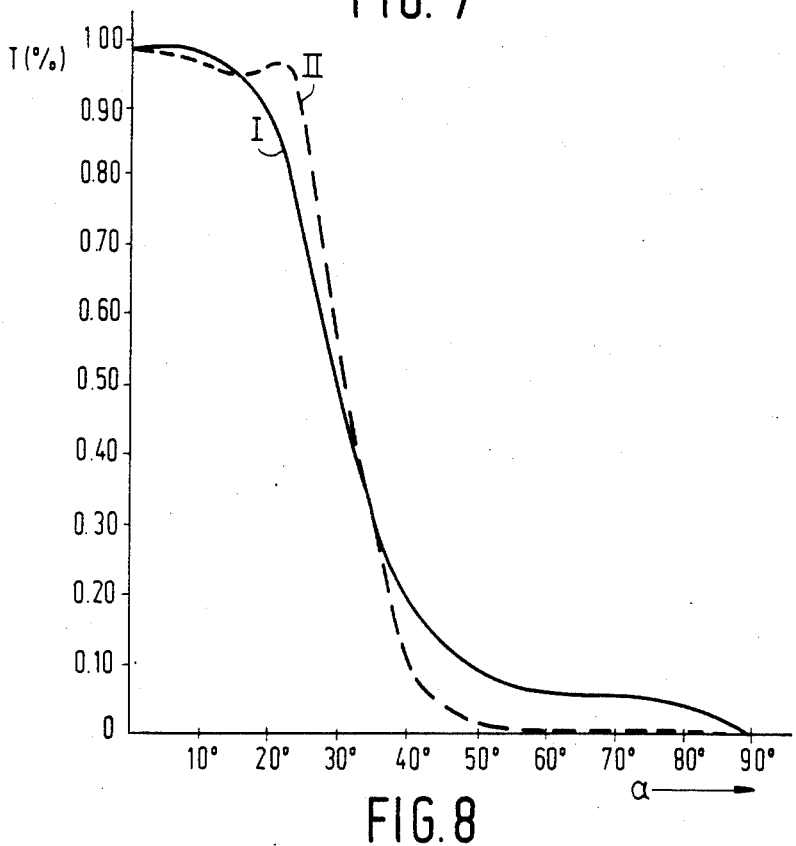
FIG. 8 shows the transmission T as a function of the angle $\alpha$ for a 14-layer-filter and a 20-layer-filter.

FIG. 8 shows the transmission T as a function of the angle $\alpha$ for a 14-layer-filter (curve I) and a 20-layer-filter (curve II for yttrium oxide-Europium with $\alpha = 612$ m. The 20-layer-filter is identical to the FIG. 3 filter, except for λ. For p=1.25$\lambda_f = 1.25 \times 612 = 765$ nm. $\alpha_{50\%} = 32°$. The 14-layer-filter looks as follows with p=1.25, $\lambda_f = 765$ and $\alpha_{50\%} = 31°$.

| Layer No. | n | n.d/λ_f |
|---|---|---|
| Phosphor | | |
| 1 | L | 0.131 |
| 2 | H | 0.260 |
| 3 | L | 0.255 |
| 4 | H | 0.251 |
| 5 | L | 0.248 |
| 6 | H | 0.246 |
| 7 | L | 0.244 |
| 8 | L | 0.243 |
| 9 | L | 0.244 |
| 10 | H | 0.246 |
| 11 | L | 0.248 |
| 12 | H | 0.251 |
| 13 | L | 0.255 |
| 14 | H | 0.260 |
| Display window | 1.57 | |

The table below finally gives a number of other embodiments and their results. Column 1 gives the kind of phosphor used for the display screen. Column 2 gives the central wavelength of said phosphor, Column 3 gives a few values of p. Column 4 gives the value of $\alpha$ for which the transmission T=50%. Column 5 gives the number of layers of the filter used.

| Kind of phosphor | λ(nm) | P | α50% (in degrees) | number of layers filter |
|---|---|---|---|---|
| blue-Tb | 490 | 1.22 | 20 | 20 |
| | | 1.25 | 32 | |
| | | 1.28 | 43 | |
| green-Tb | 544 | 1.22 | 20 | 20 |
| | | 1.25 | 32 | |
| | | 1.28 | 43 | |
| $Y_2O_3$:Eu | 612 | 1.22 | 20 | 20 |
| | | 1.25 | 32 | |
| | | 1.28 | 43 | |
| Willemite | 528 | 1.31 | 50 | 14 |
| $Y_2O_3$:Eu | 612 | 1.25 | 31 | 14 |

What is claimed is:

1. A display tube comprising in an evacuated envelope a display screen of a luminescent material provided on the inside of a display window in the wall of the envelope, and a multilayer interference filter disposed between said material and the display window, said filter comprising a plurality of layers manufactured alternately from a material having a high refractive index and a material having a low refractive index, characterized in that the filter is composed substantially of 14 to 30 layers each having an optical thickness nd, wherein n is the refractive index of the material of the layer and d is the thickness, said optical thickness nd being between 0.2$\lambda_f$ and 0.3$\lambda_f$, in which $\lambda_f$ is equal to p xλ, in which λ is the desired central wavelength selected from the spectrum emitted by the luminescent material and p is a number between 1.18 and 1.36.

2. A display tube as claimed in claim 1, characterized in that the filter is composed substantially of 18 to 22 layers.

3. A display tube as claimed in claim 1, characterized in that the optical thickness nd is between 0.23$\lambda_f$ and 0.27$\lambda_f$.

4. A display tube as claimed in claim 1, 2, or 3, characterized in that the layers of the filter having a high refractive index consist of titanium oxide ($TiO_2$) or tantalum oxide ($Ta_2O_5$) and the layers having a low refractive index consist of silicon oxide ($SiO_2$) or magnesium fluoride ($MgF_2$).

5. A display tube as claimed in claim 4, characterized in that the magnesium fluoride is provided at approximately 300° C.

6. A display tube as claimed in claim 1, 2, or 3, characterized in that the luminescent material comprises a terbium-activated, substantially green luminescing phosphor and λ=545 nm and p is a number between 1.22 and 1.27 for a $TiO_2$—$SiO_2$ filter.

7. A display tube as claimed in claim 1, 2, or 3, characterized in that the luminescent material comprises a terbium-activated blue luminescing phosphor and λ=490 nm and p is a number between 1.22 and 1.27 for a $TiO_2$—$SiO_2$ filter.

8. A display tube as claimed in claim 1 or 2, characterized in that the luminescing material is europium-activated yttrium oxide ($Y_2O_3$:Eu) and λ=612 nm and p is a number between 1.22 and 1.27 for a $TiO_2$—$SiO_2$ filter.

9. A display tube as claimed in claim 1, 2, or 3, characterized in that the luminescent material comprises terbium-activated, substantially green-luminescing phosphor and λ=545 nm and p is a number between 1.18 and 1.23 for a $Ta_2O_5$—$SiO_2$ filter.

10. A display tube as claimed in claim 1, 2, or 3, characterized in that the luminescent material comprises a terbium-activated, blue-luminescing phosphor and λ=490 nm and p is a number between 1.18 and 1.23 for a $Ta_2O_5$—$SiO_2$ filter.

11. A display tube as claimed in claim 1, 2, or 3, characterized in that the luminescent material is europium-activated yttrium oxid ($Y_2O_3$:Eu) and λ=612 nm and p is a number between 1.18 and 1.23 for a $Ta_2O_5$—$SiO_2$ filter.

12. A display tube as claimed in claim 1, 2 or 3, characterized in that the layer of the filter closest to the luminescent material has a thickness of approximately $0.25\lambda_f$, consists essentially of a material having a high refractive index, and is coated with a terminating layer having an optical thickness of approximately $0.125\lambda_f$ and consisting essentially of a material having a lower refractive index, the luminescent material being provided on said terminating layer.

13. A display tube as claimed in claim 1, 2 or 3, characterized in that the layer of the filter closest to the display window has a thickness of approximately $0.25\lambda_f$, consists essentially of a material having a high refractive index, and is coated with an intermediate layer having an optical thickness of approximately $0.125\lambda_f$ and consisting essentially of a material having a lower refractive index.

14. A display tube as claimed in claim 1, 2 or 3, characterized in that the layer of the filter closest to the luminescent material has a thickness of approximately $0.25\lambda_f$, comprises a mixture of metal oxides including titanium oxide ($TiO_2$) and a metal oxide from the group beryllium oxide (BeO), magnesium oxide (MgO) and calcium oxide (CaO), in which mixture the quantity of titanium oxide is 70 to 99% by weight.

15. A display tube as claimed in claim 1, 2 or 3, characterized in that it is a projection television display tube.

* * * * *